(12) United States Patent
Endo et al.

(10) Patent No.: US 11,391,905 B2
(45) Date of Patent: Jul. 19, 2022

(54) LENS UNIT AND CAMERA MODULE

(71) Applicant: Maxell, Ltd., Kyoto (JP)

(72) Inventors: Hidehiro Endo, Otokuni-gun (JP); Naohiro Kobayashi, Otokuni-gun (JP)

(73) Assignee: MAXELL, LTD., Otokuni-gun (JP)

( * ) Notice: Subject to any disclaimer, the term of this patent is extended or adjusted under 35 U.S.C. 154(b) by 0 days.

(21) Appl. No.: 16/772,923

(22) PCT Filed: Dec. 13, 2018

(86) PCT No.: PCT/JP2018/045980
§ 371 (c)(1),
(2) Date: Jun. 15, 2020

(87) PCT Pub. No.: WO2019/117265
PCT Pub. Date: Jun. 20, 2019

(65) Prior Publication Data
US 2021/0165184 A1      Jun. 3, 2021

(30) Foreign Application Priority Data
Dec. 14, 2017  (JP) ............................ JP2017-239442

(51) Int. Cl.
*G02B 7/02*   (2021.01)
*G03B 30/00*  (2021.01)

(52) U.S. Cl.
CPC ............ *G02B 7/021* (2013.01); *G03B 30/00* (2021.01)

(58) Field of Classification Search
CPC .................................................. G03B 30/00
See application file for complete search history.

(56) References Cited

U.S. PATENT DOCUMENTS

2006/0114579 A1   6/2006  Shibuya et al.

FOREIGN PATENT DOCUMENTS

| JP | 2004-317990 A | 11/2004 |
| JP | 2008-197584 A | 8/2008 |
| JP | 2009-251302 A | 10/2009 |

(Continued)

OTHER PUBLICATIONS

Machine translation of Horiyama et al. JP 2008197584 electronically retrieved from Espacenet May 21, 2021 (Year: 2021).*

(Continued)

*Primary Examiner* — Cara E Rakowski
(74) *Attorney, Agent, or Firm* — Oliff PLC

(57) ABSTRACT

A lens unit can inhibit deterioration in optical characteristics caused due to deformation of resin lens. The lens unit includes: a metal lens barrel; a plurality of lenses arranged on the inner peripheral side of the lens barrel in the axial direction thereof; and an annular intermediate ring disposed between the lenses adjacent to each other in the axial direction. The intermediate ring is made of metal and has a convex portion formed toward the image side or the object side. The lens is made of resin, having a concave portion fitted with the convex portion. A gap formed between the outer peripheral surface of the lens and the inner peripheral surface of the lens barrel is larger than a gap formed between the outer peripheral surface of the intermediate ring and the inner peripheral surface of the lens barrel.

4 Claims, 3 Drawing Sheets

(56) References Cited

FOREIGN PATENT DOCUMENTS

JP      2014-145859 A      8/2014
JP      2016-184082 A      10/2016

OTHER PUBLICATIONS

Machine translation of Hidenori JP 2004317990 electronically retrieved from Espacenet May 25, 2021 (Year: 2021).*
Feb. 19, 2019 International Search Report issued in International Patent Application No. PCT/JP2018/045980.
Feb. 9, 2021 Office Action issued in Japanese Patent Application No. 2017-239442.

* cited by examiner

LENS UNIT AND CAMERA MODULE

TECHNICAL FIELD

The present invention relates to a lens unit and a camera module.

BACKGROUND ART

In recent years, a camera for capturing a scene outside a vehicle or a condition inside a vehicle has been mounted in a vehicle. A camera mounted in a vehicle (hereinafter referred to as an in-vehicle camera) is exposed to a high or low temperature environment. Therefore, in order to compensate for temperature characteristics, a metal lens barrel and glass lens are often used in an in-vehicle camera.

On the other hand, regarding a camera included in a terminal such as a smartphone, what is often used is a resin lens developed for realizing a high-performance and low-cost camera.

As an example of a conventional lens unit, what is known is that disclosed in Patent Document 1. In the lens unit disclosed in Patent Document 1, five glass lenses are arranged along the inner peripheral side of a metal lens barrel with their optical axes aligned with each other along an optical axes.

CITATION LIST

Patent Document

Patent Document 1: Japanese Patent Application Laid-Open No. 2016-184082

SUMMARY OF THE INVENTION

Technical Problems

As described above, the lens unit disclosed in Patent Document 1 employs a metal lens barrel and glass lenses. Here, referring to a reference sectional view shown in FIG. 4, description will be given to explain a problem which occurs when using an aluminum lens barrel and resin lenses in the lens unit.

The lens barrel 50 is a cylindrical member made of aluminum. The lenses 51, 52, and 53 are circular resin lenses. The outer diameter of the lens 51 is formed slightly smaller than the inner diameter of the lens barrel 50. Between the outer peripheral surface of the lens 51 and the inner peripheral surface of the lens barrel 50, a gap of about 0.01 mm is formed over the entire circumference at room temperature. The position of the lens 51 in the radial direction is determined by the inner peripheral, surface of the lens barrel 50.

Namely, the position of the optical axis of the lens 51 is determined by the inner peripheral surface of the lens barrel 50. An intermediate ring 54 is an annular member made of aluminum. The outer diameter of the intermediate ring 54 is the same as the inner diameter of the lens barrel 50 or slightly smaller than the inner diameter of the lens barrel 50. Between the outer peripheral surface of the intermediate ring 54 and the inner peripheral surface of the lens barrel 50, a gap of about 0-0.01 mm is formed over the entire circumference at a room temperature of 20 degrees.

Since the intermediate ring 54 is made of aluminum, there is no difference in linear expansion coefficient between the intermediate ring 54 and the lens barrel 50. On the other hand, since the lens 51 is made of resin, a difference in linear expansion coefficient between the lens 51 and the lens barrel 50 is large. Here, as shown in FIG. 4, it is assumed that the lens 51 includes a lens portion 51a having an optical function and a flange portion 51b formed on the outer periphery thereof. At a high temperature, the flange portion 51b of the lens 51 expands radially outward, applies a radial outward force to the lens barrel 50, and receives a radially inward force (as a reaction force of the outward force) from the lens barrel 50. When the flange portion 51b receives a force acting radially inward from the lens barrel 50, the lens 51 is deformed to be distorted radially inward. For this reason, the optical axis of the lens 51 is undesirably shifted with respect to the optical axes of the lenses 52 and 53, causing a deterioration in the optical characteristics of the lens unit.

The present invention has been accomplished in view of the above circumstances, and it is an object of the present invention to provide a lens unit capable of suppressing a deterioration in optical characteristics which is caused due to deformation of resin lens. Another object of the present invention is to provide a camera module including the afore-mentioned lens unit.

Solution to the Problems

In order to solve the aforementioned problem, a lens unit according to the present invention, includes: a metal lens barrel; a plurality of lenses arranged on the inner peripheral side of the lens barrel in the axial direction thereof; and an annular intermediate ring disposed between the lenses adjacent to each other in the axial direction, wherein the intermediate ring is made of metal and includes a convex portion formed toward image side or object side of the lens barrel, a lens adjacent to the image side or the object side of the intermediate ring is made of resin, and includes a concave portion that fits with the convex portion of the intermediate ring, a gap formed between the outer peripheral surface of the resin lens and the inner peripheral surface of the lens barrel is larger than a gap formed between the outer peripheral surface of the intermediate ring and the inner peripheral surface of the lens barrel.

According to such a configuration, the concave portion of the resin lens and the convex portion of the metal intermediate ring are formed such that they can fit with each other, and a gap formed between the outer peripheral surface of the resin lens and the inner peripheral surface of the metal lens barrel is larger than a gap formed between the outer peripheral surface of the metal intermediate ring and the inner peripheral surface of the metal lens barrel. Therefore, even if the resin lens having a large linear expansion coefficient difference between the lens and barrel expands at a high temperature, the resin lens will not deform due to a force acting inwardly in the radial direction. Further, since the position of the optical axis of the resin lens is determined by the metal intermediate ring (which has a small difference in linear expansion coefficient between the lens and barrel and has only a small amount of deformation at a high temperature), it is possible to suppress an undesired shift in optical axis of lens. In this way, it is possible to ensure a desired coaxiality for the plurality of lenses disposed inside the lens barrel, and suppress a deterioration in optical characteristics.

In the above configuration of the present invention, an outer peripheral surface of the convex portion and an outer peripheral surface of the concave portion are inclined surfaces which are inclined with respect to the axial direction of the lens barrel and are in contact with each other or close to each other.

According to the above configuration of the present invention, when a resin lens is adjacent to the image side of the intermediate ring, the inclined surface of the convex portion and the inclined surface of the concave portion are inclined in a manner such that the outer diameter decreases from the object side toward the image side.

In the above configuration of the present invention, when a resin lens is adjacent to the object side of the intermediate ring, the inclined surface of the convex portion and the inclined surface of the concave portion are inclined in a manner such that the outer diameter increases from the object side toward the image side.

According to such a configuration, when the intermediate ring is inserted into the inner peripheral side of the lens barrel, the inclined surface plays a role of a guide, thus ensuring an improved efficiency in assembling the lens unit.

In the above configuration of the present invention, the resin lens adjacent to the intermediate ring is formed such that the lens has a thickness that is 25% or less of its outer diameter.

According to such a configuration, it is possible to prevent the resin lens (which has been formed such that its thickness is 25% or less of its outer diameter) from being deformed inwardly in the radial direction.

A camera module according to the present invention includes a lens unit having the above-described configuration, and an imaging element for capturing an image formed in the lens unit.

According to such a configuration, the camera module can exhibit the same functions and effects as the above-described lens unit of the present invention.

Effects of the Invention

According to the present invention, it is possible to suppress a deterioration in optical characteristics of lens caused due to deformation of resin lens.

DESCRIPTION OF EMBODIMENTS

Hereinafter, an embodiment of the present invention will be described with reference to the accompanying drawings.

Figure 1:
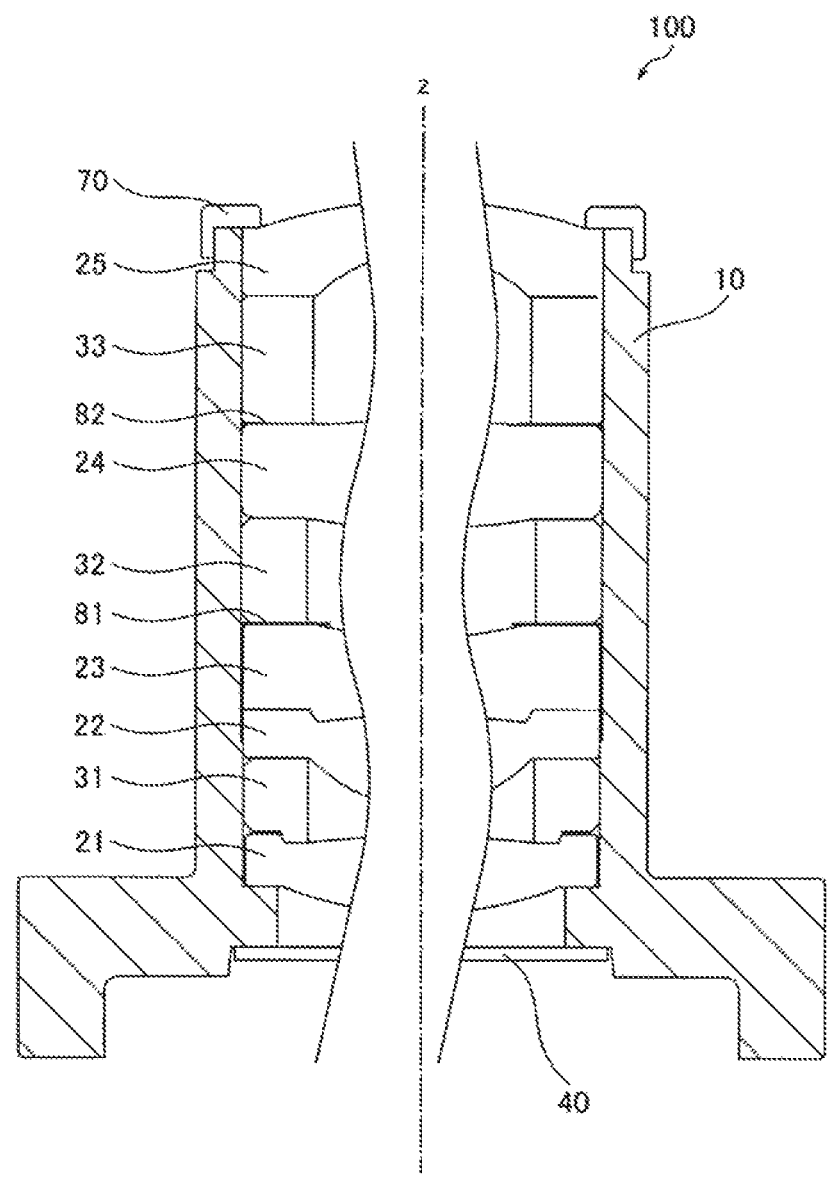
FIG. 1 is a sectional view showing a lens unit formed according to an embodiment of the present invention.
Figure 2:
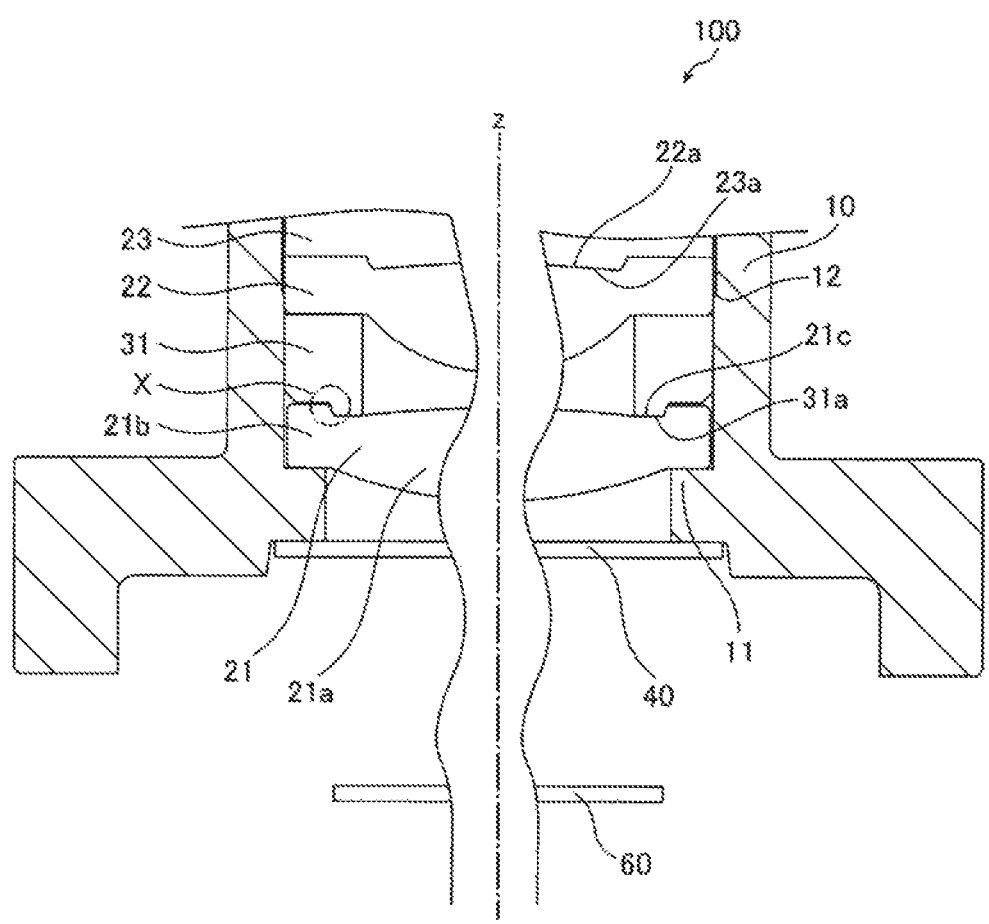
FIG. 2 is a sectional view showing a main portion of the lens unit.

FIG. 1 is a cross-sectional view of a lens unit 100 according to the present embodiment. FIG. 2 is a sectional view of a main portion of the lens unit 100.

The lens unit 100 shown in FIG. 1 is used in (for example) an in-vehicle camera. Such an in-vehicle camera is built in (for example) a back-mirror, and captures an image of an internal state of a vehicle.

As shown in FIG. 1, the lens unit 100 includes a lens barrel 10, a plurality of lenses 21, 22, 23, 24, 25, intermediate rings (spacers) 31, 32, 33, an optical filter 40, a pressing member 70, and throttle members 81, 82. In FIGS. 1-2, a hatched portion indicating a cross section is applied only to the lens barrel 10, and other components of the lens unit are not hatched.

The optical filter 40 is disposed at the image-side end of the lens unit 100 in which a plurality of lenses 21-25 together form an image. Hereinafter, the axial direction of the cylindrical lens barrel 10 is referred to as an axial direction Z. The end of the lens unit 100 on the optical filter 40 side in the axial direction Z is referred to as an image side. The end of the lens unit 100 opposite to the image side in the axial direction Z is referred to as an object side. The lens unit 100 is arranged so that its object side faces an imaging target. Further, as shown in FIG. 2, an imaging element 60 is disposed on the image side of the lens unit 100. The imaging element 60 is disposed in a camera case to which the lens unit 100 is attached in order to capture an image formed in the lens unit 100. Further, as shown in FIG. 1, the pressing member 70 is attached to the object-side end of the lens unit 100 to hold components housed inside the lens barrel 10. The pressing member 70 is made of metal, for example, aluminum.

The lens barrel 10 is made of metal, for example, aluminum. The lenses 21-25, the intermediate rings 31-33, and the throttle members 81-82 are inserted into the lens barrel 10 along the inner peripheral surface thereof, and are arranged side by side in the axial direction Z of the lens barrel 10 (hereinafter, referred to as axial direction Z).

The lenses 21-25, the intermediate rings 31-33, and the throttle members 81-82 are arranged successively from the image side to the object side, in an order of lens 21, intermediate ring 31, lens 22, lens 23, throttle member 81, intermediate ring 32, lens 2A, throttle member 82, intermediate ring 33, and lens 25. The lenses 21-25 are arranged in such a manner that their optical axes are aligned with each other and arranged side by side along the optical axis.

Hereinafter, the main portion of the lens unit 100 will be described with reference to FIG. 2. The intermediate ring 31 is disposed between the lens 21 and the lens 22 adjacent to each other in the axial direction Z. At one end of the lens barrel 10 on the image side, a support portion 11 is provided which is formed to allow the lens 21 to contact. The support portion 11 is formed inside the lens barrel 10, protruding radially and inwardly.

The lenses 22, 23 are circular resin lenses. The outer diameters of the lenses 22, 23 are smaller than the inner diameter of the lens barrel 10.

A step portion 12 with respect to the axial direction Z is formed on the inner peripheral surface of the lens barrel 10 at a position facing the outer peripheral surface (outer peripheral side surface) of the lens 22. Between the upper half of the outer peripheral surface (half on the object side) of the lens 22 and the inner peripheral surface of the lens barrel 10, a gap of about 0.1 mm is formed in radial direction over the entire circumference at room temperature. Further, between the lower half of the outer peripheral surface (half on the image side) of the lens 22 and the inner peripheral surface of the lens barrel 10, a gap of about 0.01 mm is formed in radial direction over the entire circumference at room temperature. In this way, the position of the lens 22 in the radial direction is determined by the inner peripheral surface of the lens barrel 10.

In the following, explanation will be given to the reason as to why the step portion 12 is provided on the inner peripheral surface of the lens barrel 10. Namely, when molding a lens, burrs will be inevitably formed along a parting line which is a joint line between a fixed mold and a movable mold. In the lens 23, burrs are formed to project below the flange (image side), and in the lens 22 burrs are formed to project above the flange (object side). Here, the lenses 22, 23 are bonded lenses that are integrated together by bonding, but when the lens 22 and the lens 23 are bonded together, the burrs face each other. By providing the step portion 12, burrs formed on each of the lenses 22, 23 can be accommodated in a gap of about 0.1 mm. Although the lenses 22, 23 are bonded lenses, the reason why the burrs are opposed to each other in the bonded lenses is that both lenses are to be gripped by separate jigs when assembling the lenses. This is because if burrs are present in the gripping portions at this time, the accuracy of assembly will be decreased.

A gap of about 0.1 mm at room temperature in the radial direction is provided between the outer peripheral surface of the lens 23 and the inner peripheral surface of the lens barrel 10 over the entire circumference. For this reason, the position of the lens 23 in the radial direction is not determined by the inner peripheral surface of the lens barrel 10. The lens 22 is formed with a concave portion 22a that is concave toward the image side in the axial direction Z. Further, the lens 23 is formed with a convex portion 23a having a shape protruding toward the object side in the axial direction Z. By properly fitting together the convex portion 23a of the lens 23 and the concave portion 22a of the lens 22, the position of the lens 23 in the radial direction may be determined. Namely, the position of the lens 23 in the radial direction (the position of the optical axis of the lens 23) is determined by the position of the lens 22 in the radial direction (the position of the optical axis of the lens 22). In the above description, the concave portion 22a is formed on the lens 22 and the convex portion 23a is formed on the lens 23. However, it is also possible that the concave portion may be formed on the lens 23, and the convex portion may be formed on the lens 22.

The intermediate ring 31 is an annular member. Here, the intermediate ring 31 is made of a metal, for example, aluminum. In fact, the intermediate ring 31 is formed in a manner such that it can be fitted into the lens barrel 10 in the middle. Specifically, the outer diameter of the intermediate ring 31 is set in a range from a size slightly smaller than the inner diameter of the lens barrel 10 to a size slightly larger than the inner diameter of the lens barrel 10. The outer diameter of the intermediate ring 31 is set to be in a range, for example, from a size 0.005 mm smaller than the inner diameter of the lens barrel 10 to a size 0.005 mm larger than the inner diameter of the lens barrel 10. When the outer diameter of the intermediate ring 31 is set to be 0-0.005 mm larger than the inner diameter of the lens barrel 10 in this manner, the insertion of the intermediate ring 31 into the lens barrel 10 requires the lens barrel 10 to be heated to a raised temperature.

The lens 21 is a circular resin lens, and includes a lens portion 21a having an optical function and a flange portion 21b formed on the outer periphery thereof. Further, the lens 21 is disposed adjacent to the image side of the intermediate ring 31, and the image side surface of the flange portion 21b is disposed to be in contact with the support portion 11 of the lens barrel 10. The lens 21 has a shape in which the lens portion 21a is curved from the flange portion 21b toward the image side. The object-side surface of the lens portion 21a is a concavely curved surface. The image-side surface of the lens portion 21a has a convexly curved surface at the center and a concavely curved surface at the periphery. The outer diameter of the lens 21 is smaller than the inner diameter of the lens barrel 10, and between the outer peripheral surface of the lens 21 and the inner peripheral surface of the lens barrel 10 there is formed a gap of about 0.1 mm in the radial direction at room temperature. For this reason, the position of the lens 21 in the radial direction is not determined by the inner peripheral surface of the lens barrel 10.

On the other hand, the gap between the outer peripheral surface of the intermediate ring 31 and the inner peripheral surface of the lens barrel 10 is smaller than the gap between the outer peripheral surface of the lens 21 and the inner peripheral surface of the lens barrel 10. For this reason, the position of the intermediate ring 31 in the radial direction is determined by the inner peripheral surface of the lens barrel 10. The lens 21 and the intermediate ring 31 are formed in a manner such that they can be fitted to each other by a fitting portion (to be described later). Therefore, the position of the lens 21 in the radial direction (the position of the optical axis of the lens 21) is determined by the position of the intermediate ring 31 in the radial direction.

Hereinafter, description will be given to a fitting portion between the lens 21 and the intermediate ring 31. In detail, the fitting portion between the lens 21 and the intermediate ring 31 is formed by a concave portion 21c and a convex portion 31a.

The concave portion 21c is formed on the object-side surface of the flange portion 21b. Further, the concave portion 21c has a shape depressed toward the image side in the axial direction Z, and is formed in an annular shape over the entire circumference of the flange portion 21b. FIG. 2 shows an example in which the concave portion 21c is formed on the inner peripheral side of the lens 21. On the other hand, the concave portion 21c may also be formed on the outer peripheral side of the lens 21.

The convex portion 31a is formed on the image-side surface of the intermediate ring 31. The convex portion 31a has a shape protruding toward the image side in the axial direction Z, and is formed in a circular shape over the entire circumference of the intermediate ring 31. FIG. 2 shows an example in which the convex portion 31a is formed on the inner peripheral side of the intermediate ring 31. On the other hand, the convex portion 31a may also be formed on the outer peripheral side of the intermediate ring 31.

When the concave portion is formed in the intermediate ring 31 and the convex portion is formed in the lens 21, the lens 21 receives a force from the intermediate ring 31 due to a difference in linear expansion coefficient between the intermediate ring 31 and the lens 21, causing a problem that optical performance is deteriorated.

Figure 3:
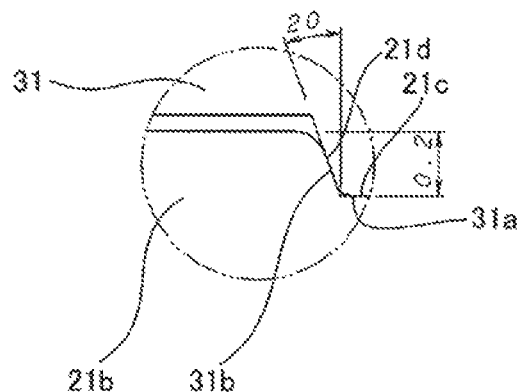
FIG. 3 is an enlarged sectional view showing a fitting portion within the lens unit.

FIG. 3 is an enlarged cross-sectional view showing a fitting portion (portion X in FIG. 2). Here, a depression amount of the concave portion 21c is, for example, 0.2 mm. The outer peripheral surface of the convex portion 31a is a tapered surface 31b inclined with respect to the axial direction Z. The inclined surface 31b is formed such that its outer diameter decreases from the object side toward the image side. The inclined surface 31b is inclined, for example, by about 20° with respect to the axial direction Z (optical axis direction) of the lens barrel 10. The outer peripheral surface of the concave portion 21c is an inclined surface 21d in contact with or close to the inclined surface 31b. A gap of about 0.01 mm or less is formed between the inclined surface 31b and the inclined surface 21d.

The tip surface of the convex portion 31a is formed such that it can contact the bottom surface of the concave portion 21c. Thus, the lens 21 is sandwiched between the distal end surface of the convex portion 31a and the support portion 11 of the lens barrel 10 in the axial direction Z. The inclined surface 21d of the concave portion 21c is in contact with or close to the inclined surface 31b of the convex portion 31a.

In this way, it is possible for the position of the lens 21 to be restricted in the axial direction Z and radial direction. When the tip end surface of the convex portion 31a is in contact with the bottom surface of the concave portion 21c, a gap is formed between the image-side surface of the intermediate ring 31 and the object-side surface of the flange portion 21b in the axial direction Z.

The lens unit 100, together with the image sensor 60, the wiring board, the signal processing circuit, the flexible wiring sheet, the connector and the like, forms a camera module. Here, the camera module refers to a module including at least the lens unit 100 and the imaging element 60.

The imaging element 60 is a general image sensor such as CCD (Charge Coupled Device) or CMOS (Complementary Metal Oxide Semiconductor).

In the lens unit 100 and the camera module configured as described above, the concave portion 21c of the resin lens 21 and the convex portion 31a of the metal intermediate ring 31 are formed in a manner such that they can fit with each other. Further, the gap between the outer peripheral surface of the resin lens 21 and the inner peripheral surface of the metal barrel 10 is formed to be larger than the gap between the outer peripheral surface of the metal intermediate ring 31 and the inner peripheral surface of the metal barrel 10. Therefore, even if the resin lens 21 (having a large linear expansion coefficient difference between the resin lens and metal) expands, the resin lens 21 will not deform by receiving a force acting in a radially inward direction.

In addition, since the position of the optical axis of the resin lens 21 is determined by the metal intermediate ring 31, which has a small difference in linear expansion coefficient between the metal ring and the lens barrel 10 and has only a small amount of deformation at a high temperature, it is possible to inhibit an undesired shift in lens optical axis. In this way, it is possible to ensure a desired coaxiality for the plurality of lenses 21-25 arranged inside the lens barrel 10, thus inhibiting a deterioration in optical characteristic. Here, the linear expansion coefficient of the lens barrel 10 and the intermediate ring 31 (all made of metal) is, for example, 2.4×E−5. The linear expansion coefficient of the resin lens 21 is, for example, 6.0×E−5.

The outer peripheral surface of the convex portion 31a and the outer peripheral surface of the concave portion 21c are inclined surfaces 31b, 21d that are inclined with respect to the axial direction Z and are in contact with each other or close to each other. In this way, when inserting the intermediate ring 31 into the lens barrel 10, the inclined surfaces 31b, 21d can serve as a guide, thus improving an efficiency in assembling the lens unit. In addition, there is also an effect that metal mold can be easily manufactured and such mold can be smoothly released at the time of manufacturing components.

Figure 4:
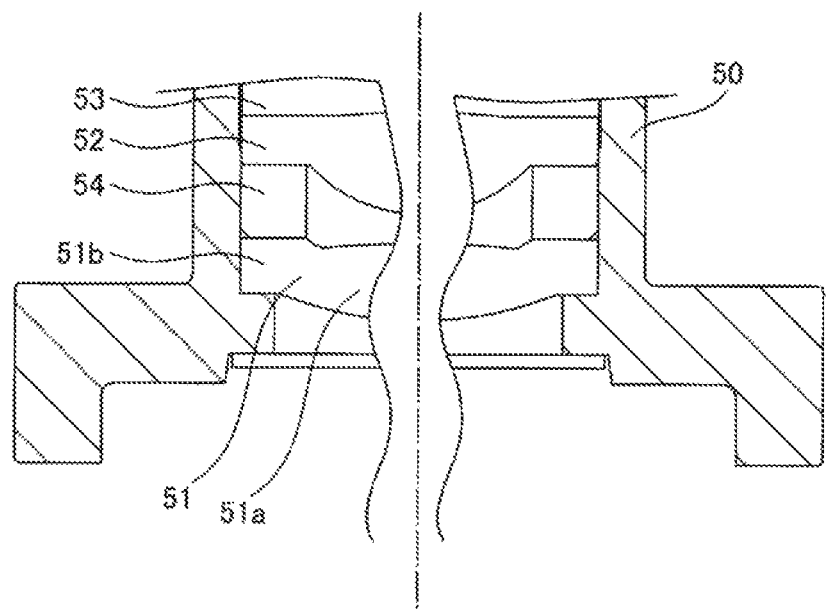
FIG. 4 is a reference cross-sectional view explaining a problem in a conventional structure.

In a conventional structure shown in FIG. 4, particularly when the thickness of the lens 51 is 25% or less of its outer diameter, the lens 51 has a large deformation at a high temperature. On the other hand, in the lens unit 100 formed according to the present embodiment, when the thickness of the lens 21 is 25% or less of its outer diameter, i.e., when the lens 21 has a thickness of 1.2 mm and an outer diameter of 3 mm, it is possible to inhibit a deformation in the lens 21 at high temperatures. On the other hand, since the lens 22 and the lens 23 have a large thickness with respect to their outer diameters, there is only a small deformation amount at a high temperature.

In the above embodiment, description has been given to an example in which the lens 21 is disposed adjacent to the intermediate ring 31 on its image side. However, the present invention should not be limited by this embodiment. In fact, it is also possible for the lens 21 to be disposed adjacent to the intermediate ring 31 on its object side. In such condition, the convex portion 31a of the intermediate ring 31 protrudes toward the object side in the axial direction Z, and the concave portion 21c of the lens 21 is formed to be depressed toward the object side in the axial direction Z. At this time, the inclined surface 31b and the inclined surface 21d are formed such that their outer diameters are increasing from the object side toward the image side.

In the above-described embodiment, description has been given to an example in which the lenses 21, 22, 23 are made of resin. On the other hand, it is also possible that the lenses (lenses 22-25) other than the resin lens 21 adjacent to the image side or the object side of the intermediate ring 31 may also be made of resin or glass.

EXPLANATION OF REFERENCE NUMERALS 10 lens barrel
21, 22, 23, 24, 25 lenses
21c concave portion
21d inclined surface
31 intermediate ring
31a convex portion
31b inclined surface
60 imaging element

The invention claimed is:
1. A lens unit comprising:
a metal lens barrel;
a plurality of lenses; and
an annular intermediate ring, wherein:
the plurality of lenses and the annular intermediate ring are arranged in the lens barrel along an axial direction of the lens barrel,
the plurality of lenses and the annular intermediate ring are arranged on an inner peripheral side of the lens barrel in the axial direction thereof,
the annular intermediate ring is disposed between lenses of the plurality of lenses adjacent to each other in the axial direction,
the intermediate ring is made of metal,
a resin lens of the plurality of lenses adjacent to an image side or an object side of the intermediate ring is made of resin,
the intermediate ring and the resin lens are fitted with each other, and an inclined surface is provided in a fitted portion between the intermediate ring and the resin lens, the inclined surface being inclined with respect to the axial direction of the lens barrel, and allowing a contact between the intermediate ring and resin lens, or allowing a proximity between the intermediate ring and resin lens,
the intermediate ring and the resin lens are configured such that:
when the intermediate ring and the resin lens are adjacent to each other and the intermediate ring is on a first side and the resin lens is on a second side, the inclined surface is inclined radially inwardly from the first side to the second side in the axial direction of the lens barrel, and
when the resin lens and the intermediate ring are adjacent to each other and the resin lens is on the first side and the intermediate ring is on the second side, the inclined surface is inclined radially outwardly from the first side to the second side in the axial direction of the lens barrel, a first gap is formed between an outer peripheral surface of the intermediate ring and an inner peripheral surface of the lens barrel, a second gap formed between an outer peripheral surface of the resin lens and the inner peripheral surface of the lens barrel is larger than the first gap formed between the outer peripheral surface of the intermediate ring and the inner peripheral surface of the lens barrel, a surface located radially inwardly beyond the inclined surface of the intermediate ring is in contact with a surface located radially inwardly beyond the inclined surface of the resin lens, and a third gap is formed between a surface located radially outwardly beyond the inclined surface of the intermediate ring and a surface located radially outwardly beyond the inclined surface of the resin lens, the third gap being formed in the axial direction of lens barrel.

2. The lens unit according to claim 1, wherein the resin lens adjacent to the intermediate ring is formed such that the lens has a thickness that is 25% or less of its outer diameter.

3. A camera module comprising: a lens unit according to claim 1; and an imaging element for capturing an image formed in the lens unit.

4. A camera module comprising: a lens unit according to claim 2; and an imaging element for capturing an image formed in the lens unit.

* * * * *